US005687106A

United States Patent [19]

Schwarz et al.

[11] Patent Number: 5,687,106
[45] Date of Patent: Nov. 11, 1997

[54] IMPLEMENTATION OF BINARY FLOATING POINT USING HEXADECIMAL FLOATING POINT UNIT

[75] Inventors: Eric Mark Schwarz, Gardiner; Charles Franklin Webb; Kai-Ann Ho, both of Poughkeepsie, all of N.Y.

[73] Assignee: International Business Machines Corporation, Armonk, N.Y.

[21] Appl. No.: 414,250

[22] Filed: Mar. 31, 1995

[51] Int. Cl.⁶ .................................. G06F 7/38; G06F 7/00
[52] U.S. Cl. ............................ 364/748; 364/715.03
[58] Field of Search ........................ 364/715.01, 715.03, 364/745, 748; 341/89, 94, 104, 105

[56] References Cited

U.S. PATENT DOCUMENTS

| | | | |
|---|---|---|---|
| 4,792,793 | 12/1988 | Rawlinson et al. | 341/89 |
| 4,942,547 | 7/1990 | Joyce et al. | 364/748 |
| 4,949,291 | 8/1990 | Saini | 364/715.03 |
| 5,058,048 | 10/1991 | Gupta et al. | 364/748 |
| 5,161,117 | 11/1992 | Waggener, Jr. | 364/715.03 |
| 5,191,335 | 3/1993 | Leitherer | 341/94 |
| 5,235,533 | 8/1993 | Sweedle | 364/715.03 |
| 5,249,149 | 9/1993 | Cocanougher et al. | 364/748 |
| 5,267,186 | 11/1993 | Gupta et al. | 364/748 |
| 5,305,248 | 4/1994 | Ammann | 364/748 |
| 5,307,301 | 4/1994 | Sweedler | 364/748 |
| 5,309,383 | 5/1994 | Kuroiwa | 364/748 |
| 5,337,265 | 8/1994 | Desrosiers et al. | 364/748 |
| 5,523,961 | 6/1996 | Naini | 364/715.03 |

FOREIGN PATENT DOCUMENTS

| | | |
|---|---|---|
| 62-249230 | 10/1987 | Japan . |
| 1217622 | 8/1989 | Japan . |
| 1237822 | 9/1989 | Japan . |
| 1290535 | 2/1987 | U.S.S.R. . |
| 89/10189 | 7/1989 | WIPO . |

*Primary Examiner*—Chuong D. Ngo
*Attorney, Agent, or Firm*—Lynn L. Augspurger

[57] ABSTRACT

A computer system supporting multiple floating point architectures. In an embodiment of the invention, a floating point unit (FPU) is optimized for hex format. The FPU uses a hex internal dataflow with a with an exponent and bias sufficient to support a binary floating point architecture. The FPU includes format conversion means, rounding means, sticky bit calculation means, and special number control means to execute binary floating point operations according to the IEEE 754 standard. An embodiment of the invention provides a system for executing floating point operations in either IBM S/390 hexadecimal format or IEEE 754 binary format.

17 Claims, 5 Drawing Sheets

IMPLEMENTATION OF BINARY FLOATING POINT USING HEXADECIMAL FLOATING POINT UNIT

FIELD OF THE INVENTION

The present invention relates to computer systems and architecture, and more particularly, to a computer system supporting two floating point architectures.

BACKGROUND OF THE INVENTION

In the ensuing description of the prior art and the present invention, the following are herein incorporated by reference:

"Enterprise Systems Architecture/390 Principles of Operation," Order No. SA22-7201-02, available through IBM branch offices, 1994; and "IEEE standard for binary floating-point arithmetic, ANSI/IEEE Std 754-1985," The Institute of Electrical and Electronic Engineers, Inc., New York, August 1985.

Generally, computer systems are designed in accordance with supporting a specific floating point architecture, such as either IEEE Binary Floating Point Standard 754-1985 or IBM S/390 hexadecimal floating point format. Generally, applications which are directed to one floating point standard are not compatible with another floating point standard. Thus, a user is limited in terms of "buying into" a certain architecture and to software applications developed therefor. Users, however, generally wish to run the same application on different platforms supporting different floating point architectures, or use data generated by applications on one platform with a different application on another platform that supports a different floating point architecture. Moreover, a user generally wishes to be able to run on a single machine applications that are based on different floating point architectures. These needs are particularly germane to multi-tasking environments provided by mainframe systems, where task switching occurs among many different users who generally wish to run applications based on different floating point architectures. Accordingly, the system must dynamically accommodate any of the different floating point architectures.

There is a need, therefore, to have a computer system that supports two floating architectures. Moreover, such a computer system should provide the two floating point architectures with high performance and with limited resources. That is, multiple floating point architecture support should be provided without having to essentially duplicate floating point hardware and without sacrificing performance. In addition, such an architecture should generally be transparent to a user to the greatest extent possible in order to simplify interaction (e.g., programming, switching between different applications, etc.) between the user and the system.

SUMMARY OF THE INVENTION

The present invention provides a computer system supporting multiple floating point formats. In an embodiment of the present invention, an IBM S/390 hexadecimal floating point architecture and IEEE 754 binary floating point architecture are supported by having an internal dataflow which accommodates both formats, and in which all operations are executed. The system includes format conversion means for converting between the internal dataflow and the architected datatypes. In addition, in order to conform to the IEEE 754 standard, the system includes: means for determining a sticky bit; means for rounding a binary floating point number according to IEEE 754 rounding modes; and means for special number handling. In accordance with an embodiment of the present invention, the internal dataflow is a hexadecimal dataflow which optimizes the conversions from architected to internal format for the S/390 architecture.

BRIEF DESCRIPTION OF THE DRAWINGS

Additional aspects, features, and advantages of the invention will be understood and will become more readily apparent when the invention is considered in the light of the following description made in conjunction with the accompanying drawings, wherein.

DETAILED DESCRIPTION OF THE INVENTION

Supported Architectures

An implementation of the present invention described hereinbelow supports both S/390 hexadecimal floating point and IEEE 754 binary floating point numbers. The formats are shown below in Table 1:

Table 1

| Format | Sign(s) | Exponent (e) bits | Exponent (e) bias | Fraction (f) | Total Width |
|---|---|---|---|---|---|
| Hex Short | 1 | 7 | 64 | 24 | 32 |
| Hex Long | 1 | 7 | 64 | 56 | 64 |
| Hex Extended | 1 | 7 | 64 | 112 | 128 |
| Binary Single | 1 | 8 | 127 | 24 | 32 |
| Binary Double | 1 | 11 | 1023 | 53 | 64 |
| Binary Double Extended | 1 | 15 | 16383 | 113 | 128 |

Hexadecimal Floating point numbers have an exponent with a base of 16 as described by the following equation:

$$A=(-1)^s * f * 16^{(e-bias)}$$

where f<1.0 and a normalized number is when f has the following characteristic: $0.1_{16} <= f < 1.0_{16}$ Binary floating point numbers have an exponent with a base of 2 as described by the following equation:

$$A=(-1)^s * f * 2^{(e-bias)}$$

where f<1.0 and a normalized number is when f has the following characteristic: $1.0_2 <= 1.f < 10.0_2$ Also IEEE 754 standard defines several special numbers. These numbers are described in Table 2:

Table 2

| IEEE 754 Special Numbers | | |
|---|---|---|
| Fraction | f = 0 | fl = 0 |
| Exponent | | |
| e = zeros | +0/−0 | DeNorm |
| e = ones | +infinity/−infinity | NaN |

If the fraction is zero and the exponent is all zeros, a plus or minus zero is represented. If the fraction is zero and the exponent is all ones, plus or minus infinity is represented. If the fraction is not equal to zero and the exponent is all zeros, a denormalized number is represented. If the exponent is all ones and the fraction is non-zero a Not-A-Number is represented.

HEX Internal Dataflow

In accordance with the present invention, providing support for two floating point architectures may be provided by having an internal dataflow which executes all floating point operations using an expanded format that accommodates both floating point formats. In an embodiment of the present invention, IEEE 754 and IBM S/390 hexadecimal formats are both supported by an expanded hexadecimal format to support IEEE 754 floating point numbers. This internal hexadecimal format supports the full exponent range of both IEEE 754 and S/390 with a 14 bit hexadecimal exponent biased by 8192. The dataflow supports a long floating point format which allows for 56 bits of fraction for each operand. The following is a description of this format:

$$A=(-1)^s*f*16^{(e-8192)}$$

This format is very similar to the standard S/390 format but with a greater range of exponent. There is no leading one and the fraction is less than one. The bias is a hex type of bias ($2^N$) rather than a binary bias ($2^N-1$). This optimizes, in terms of latency, the conversions from architected to internal format for the S/390 architecture. It may be appreciated, however, that in certain situations it may instead be desirable to select an internal format that optimizes the conversions from architected to internal format for the IEEE 754 architecture.

Overview of Hardware Support for Multiple Architectures

The actual hardware needed to support both architectures consists of 4 types of format conversion hardware, a rounder, sticky bit determination, and controls for special number handling.

Figure 1:
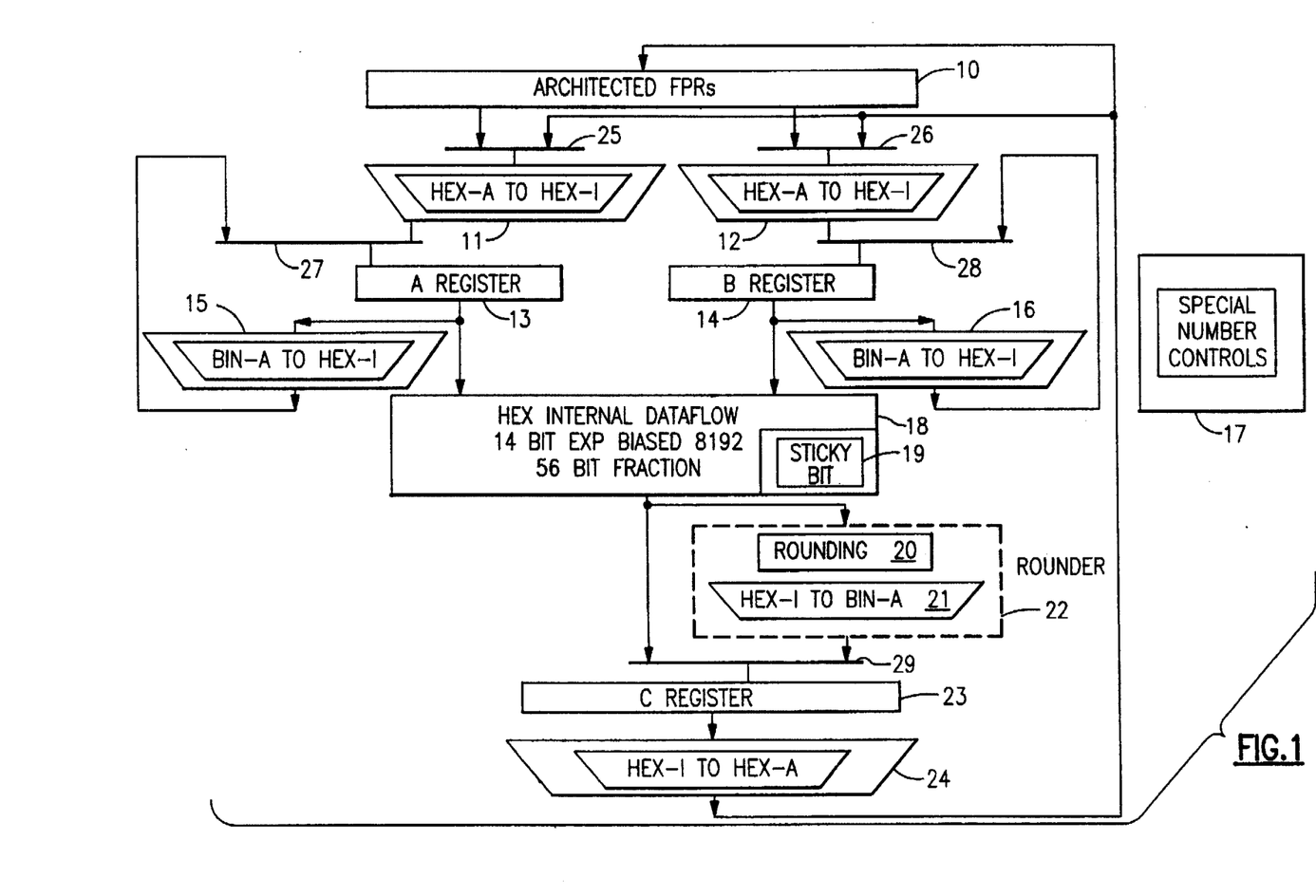
FIG. 1 provides an overview of the dataflow of a Floating Point Unit (FPU), in accordance with the present invention.

FIG. 1 provides an overview of the dataflow of the Floating Point Unit (FPU) which supports both S/390 and IEEE 754 architecture. The FPU has a localized high-speed memory referred to as the Floating Point Registers (FPRs) 10. The control unit which is not illustrated receives an instruction which it decodes and issues control signals to the dataflow. Instructions consist of an operation and a register specification. A typical instruction would indicate multiply FPR '0' by FPR '2' and place the result in FPR '0' ('0' and '2' refer to specific registers from among FPRs 10). Also, there is a mode bit which indicates whether to perform this operation in S/390 architecture or in IEEE 754. In addition, there is indication of the length of the operands in the instruction text. An instruction can also specify the operation to be performed on one register value and one value from memory with the result stored in a register. For simplicity this case is not shown but this case is supported by a memory bus being connected to B register 14.

Basically, two operands are transmitted from the FPRs 10 to the two hex architected to hex internal converters 11, 12. This conversion is rather straight forward given the representation of hex architected (56 fraction bits, 7 exponent bits, 1 sign bit, with hex exponent bias of 64) to hex internal notation (56 fraction bits, 14 exponent bits, 1 sign bit, with hex exponent bias of 8192), and is shown in Table 3 hereinbelow. The expansion is very similar to sign extension of a two's complement number. This format conversion is very fast and does not require much hardware. Thus, no extra stages are required for this conversion which is performed in parallel on both input operands.

There is a multiplexor 25 which drives the converter 11, its selection is controlled by the FPU control logic (not illustrated) which chooses between two input ports, the port 1 of the FPRs 10 and the result bus output from hex internal to hex architected block 24. The hex architected to hex internal converter 11 receives the output of multiplexor 25, converts the data to hex internal format, and transmits its output to the multiplexor 27 above A register 13. This multiplexor 27 chooses between the converter output 11 and the converter output 15. The choice is made by FPU control logic and is dependent on the binary mode and whether there is valid data in either converter. The output of multiplexor 27 is driven to A register 13.

There is a multiplexor 26 which drives the converter 12, its selection is controlled by the FPU control logic (not illustrated) which chooses between two input ports, the port 2 of the FPRs 10 and the result bus output from hex internal to hex architected block 24. The hex architected to hex internal converter 12 receives the output of multiplexor 26, converts the data to hex internal format, and transmits its output to the multiplexor above B register 28. This multiplexor 28 chooses between the converter output 12 and the converter output 16. The choice is made by FPU control logic and is dependent on the binary mode and whether there is valid data in either converter. The output of multiplexor 28 is driven to B register 14.

A register 13 receives the data and either transmits the result in the following cycle to the hex internal dataflow 18 if the operand was in hex format or transmits it to a binary architected to hex internal converter 15 which then transmits the result back to A register 13 and in the following cycle is transmitted on the hex internal dataflow 18.

B register 14 receives the data and either transmits the result in the following cycle to the hex internal dataflow 18 if the operand was in hex format or transmits it to a binary architected to hex internal converter 16 which then transmits the result back to B register 14 which and in the following cycle transmits the result on to the hex internal dataflow 18.

Figure 2:
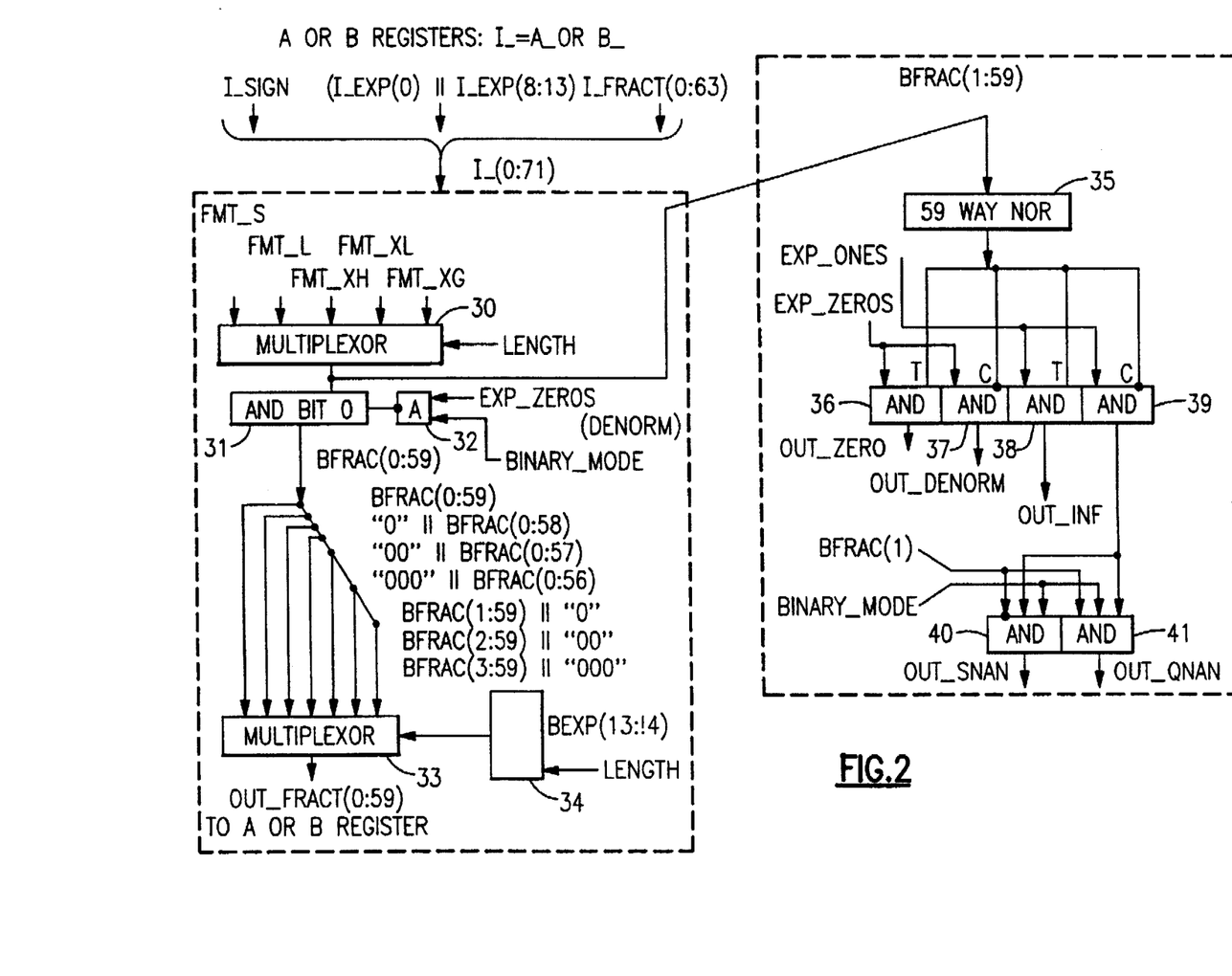
FIG. 2 describes the fraction portion of binary architected to hex internal converters, in accordance with an embodiment of the present invention.
Figure 3:
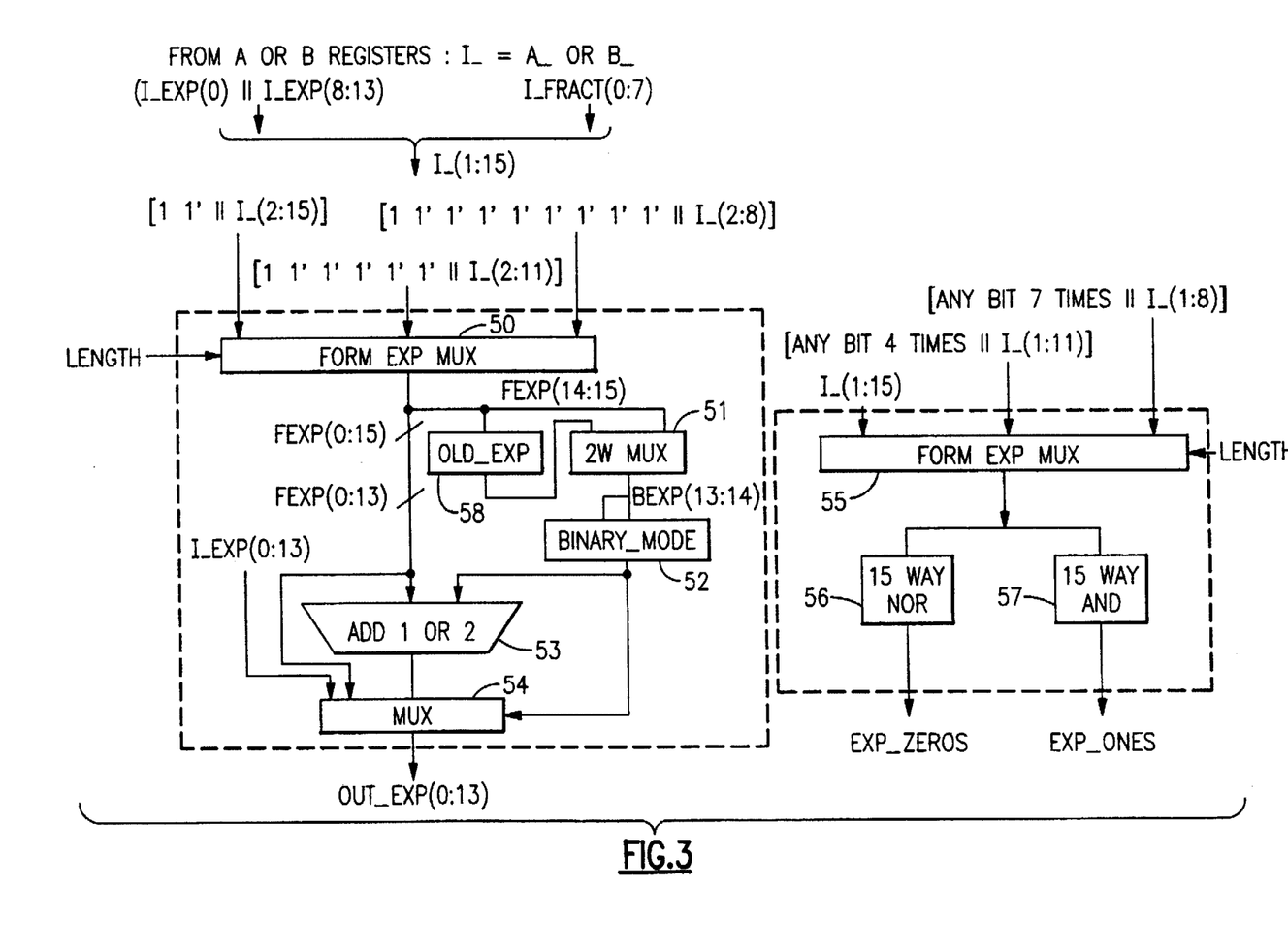
FIG. 3 shows the hardware employed for the exponent portion of the two binary architected to hex internal converters, in accordance with an embodiment of the present invention.

The binary architected to hex internal converters 15, 16 are described in more detail in FIG. 2 and FIG. 3.

Once the data has been converted to the hex internal representation which consists of a 56 bit fraction, 14 bit hexadecimal exponent biased by 8192, and a sign bit, the two operands are input to the hex internal dataflow 18 of the floating point unit. This hex internal dataflow 18 supports all floating point operations defined by S/390 and IEEE 754 such as add and multiply. The hex internal dataflow 18 is adapted to provide the function of computing a sticky bit 19 as defined by the IEEE 754 specification. This consists of ORing any bits after the guard bit that are truncated from the calculations which typically occurs on alignment of operands normalization of operands.

The output of the internal dataflow 18 is transmitted to a Rounder 22 and the C multiplexor 29. If the operation is on binary operands, the data is rounded 20 and transformed back into binary architected notation 21 by the rounder 22 and then transmitted to C multiplexor 29. The path skipping the rounder 22 and directly driving the data from the internal dataflow 18 of the C multiplexor 29 is used for hex operations. The C register 23 is driven by the C multiplexor 29 which is controlled by the FPU control logic which bases its selection on the mode of operations: hex or binary.

The output of C register 23 is connected to a hex internal to hex architected converter 24 simply involves transmitting the sign and fraction without any transformation and driving bits 0 and 8 through 13 of the 14 bit exponent. The output of this converter 24 is connected back to the FPRs to a write port and to wrap back to the dataflow to a multiplexor 25, 26 above the hex architected to hex internal converters 11, 12.

In addition, there is additional hardware included in the controls which are invoked in the case of a special number being detected in the binary architected to hex internal converters 15, 16. In this case, the pipeline of instructions is halted and the result is determined from a look-up table and transmitted to the FPRs. An example is multiplying positive infinity by a negative non-zero number which would result in the special number negative infinity being written into the FPRs.

Format Conversion: HEX Architected to HEX Internal

The transformation between these formats is shown by the following equations. Note that only the exponent needs to be changed.

$$(-1)^{s} *fa*16^{(Ea-64)} = (-1)^{s} *fa*16^{(Ea''-8192)}$$

$$16^{(Ea-64)} = 16^{(Ea''-8192)}$$

$$Ea-64 = Ea''-8192$$

$$Ea'' = Ea+8192-64$$

$$Ea'' = Ea+2^{13}-2^{6}$$

The following table shows that the transformation of exponent requires driving the most significant bit to bit position 0 and inverted to bit positions 1 through 7. Bits 1 through 6 of the input exponent are simply driven to bits 8 through 13 of the output exponent. Note that ' is used to indicated an inversion or complement operation.

TABLE 3

Format Conversion for Hex Architected to Hex Internal

| Positional Weight | $2^{13}$ | $2^{12}$ | $2^{11}$ | $2^{10}$ | $2^{9}$ | $2^{8}$ | $2^{7}$ | $2^{6}$ | $2^{5}$ | $2^{4}$ | $2^{3}$ | $2^{2}$ | $2^{1}$ | $2^{0}$ |
|---|---|---|---|---|---|---|---|---|---|---|---|---|---|---|
| Bit Position | 0 | 1 | 2 | 3 | 4 | 5 | 6 | 7 | 8 | 9 | 10 | 11 | 12 | 12 |
| Ea | | | | | | | | x0 | x1 | x2 | x3 | x4 | x5 | x6 |
| $2^{13}-2^{6}$ | 0 | 1 | 1 | 1 | 1 | 1 | 1 | 1 | 0 | 0 | 0 | 0 | 0 | 0 |
| Ea'' = | x0 | x0' | x0' | x0' | x0' | x0' | x0' | x0' | x1 | x2 | x3 | x4 | x5 | x6 |

Format Conversion: Binary Architected to HEX Internal

A binary number is transformed to have a hexadecimal exponent. This requires two less bits of exponent (base 2 versus base 16) and allows the hexadecimal datapath to be used for both formats. The number of exponent bits for double precision binary is 11 bits which requires only 9 bits for a hex exponent to represent. Note, that shifting and exponent update is needed to force the binary fraction into the hex fraction range. Also, the biases between the two architectures differ significantly. The following equations show how the final transformation is derived.

$$1.xxx * 2^{(E-b)} = (\text{hex fraction}) * 16^{(E''-b'')}$$
Assume: E mod 4 = 0; b = 127 b'' = 8192
$$1.xxx * 2^{(E-127)} = (\text{hex-frac}) * 16^{(E''-8192)}$$
$$= 1.xxx * 16^{((E-127)/4)}$$
$$= 1.xxx * 16^{((E-28)+1)/4 + 8192 - 8192)}$$
$$= 1.xxx * 2^{1} * 16^{((E/4 - 32 + 8192) - 8192)}$$
$$= 1x.xxx * 16^{((E/4 + 2(13)) - 2^{(5)}) - 8192)}$$
$$= 0.001xxx * 16^{((E/4 + 1 + 2(13)) - 2^{(5)}) - 8192)}$$
$$E'' = (E>>2) + 1 + 2^{13} - 2^{(5)}$$
$$E'' = \text{SIGNEXT}(E>>2) + 1$$

Note that E>>2 is used to indicate a two bit shift right operation which is equivalent to an integer divided by 4. The result of E>>2 for the binary single notation has only 6 bits of significance. $2^{(13)}-2^{(5)}$ is equivalent to a series of ones from second most significant bit to the most significant bit of E>>2. Thus, the following describes this transformation:

| Positional Weight | $2^{13}$ | $2^{12}$ | $2^{11}$ | $2^{10}$ | $2^{9}$ | $2^{8}$ | $2^{7}$ | $2^{6}$ | $2^{5}$ | $2^{4}$ | $2^{3}$ | $2^{2}$ | $2^{1}$ | $2^{0}$ |
|---|---|---|---|---|---|---|---|---|---|---|---|---|---|---|
| Bit Position | 0 | 1 | 2 | 3 | 4 | 5 | 6 | 7 | 8 | 9 | 10 | 11 | 12 | 13 |
| $2^{13}-2^{5}$ | 0 | 1 | 1 | 1 | 1 | 1 | 1 | 1 | 1 | 0 | 0 | 0 | 0 | 0 |
| E>>2 | | | | | | | | | x8 | x9 | x10 | x11 | x12 | x13 |
| (E>>2)+$2^{-}-2^{5}$ = | x8 | x8' | x8' | x8' | x8' | x8' | x8' | x8' | x8' | x9 | x10 | x11 | x12 | x13 |

This function of complementing the most significant bit and extending it to bit 0 of the 14 notation with the most significant bit no complemented (true) is defined to be the function SIGNEXT. It can be shown that this function occurs in the derivation for binary short, long, or extended format conversion. Below is a table describing the conversion for any of operand length:

$$1.xxx*2^{3}*2^{(E-bias)} = (0.0001_{2}||52 \text{ bits})*16^{(SIGNEXT(E>>2)+2)} -8192)$$

$1.\text{xxx}*2^0*2^{(E-bias)} = (0.001_2 || 52 \text{ bits}|0)*16^{(SIGNEXT(E>>2)+1)-8192)}$ $1.\text{xxx}*2^1*2^{(E-bias)} = (0.01_2 || 52 \text{ bits}|00)*16^{(SIGNEXT(E>>2)+1)-8192)}$ $1.\text{xxx}*2^2*2^{(E-bias)} = (0.1_2 || 52 \text{ bits}|000)*16^{(SIGNEXT(E>>2)+1)-8192)}$ The implementation of conversion and detection of special numbers is shown and described in additional detail in FIG. 2 and FIG. 3.

FIG. 2 describes the fraction portion of binary architected to hex internal converters, 15, 16 from FIG. 1. These converters 15, 16 are the same and rather than using A or B register for describing the input signals, instead the signal "I_" representing the sign, exponent, and fraction, and "I_SIGN" representing only the sign bit, "I_EXP" represents the 14 exponent bits, and "I_FRACT" represents the 64 fraction bits. Note that there are 64 fraction bits maintained internally to provide higher precision on intermediate calculations such an example is the division operation where a higher precision must be maintained for intermediate calculations than for the input or final result.

I_(0:71)=I_SIGN||I_EXP(0)||I_EXP(8:13)

|| I_FRACT(0:63) where || represents the concatenation symbol and (M:N) represents range of bits of the input from bit M to and including bit N.

Note that this fraction converter can be separated into two functions: the fraction conversion and the detection of special numbers. First the fraction conversion is described.

I_(0:71) is input to the 5 to 1 multiplexor 30 where any of 5 different formats are chosen based on the input operand length. For a short operand the format FMT_S is selected, for a long operand the format FMT_L is chosen, for extended operands with 113 bits of fraction, the data is partitioned into 3 groups. The high order bits have the format FMT_XH, the middle or low bits have the format FMT_XL, and the very least significant or sometimes called guard bits have the format FMT_XG. These formats are described by the following equations.

FMT_S(0:59)=["1"||I_(9:31)||0(36)]

FMT_L(0:59)=["1"||I_(23:63)||0(7)]

FMT_XH(0:59)=["1"||I_(16:63)||I_(0:6)||0(4)]

FMT_XL(0:59)=[I_(4:63)]

FMT_XG(0:59)=[0(48)||I_(60:63)||0(8)]

where "1" represents a logical value of one or high, and 0(M) represents the concatenation of M number of logical zeros or low values.

For the extended operands, the operations are performed by a software routine which operates on the 3 portions of data.

The most significant bit, bit 0, of the multiplexor 30 is transmitted to a 2 way AND gate 31. The other input to the multiplexor is a signal which indicates that the number is not denormalized which is formed by a 2 input NAND gate 32. This NAND gate 32 has two inputs exp_zeros which comes from the paired exponent portion of the hex architected to hex internal converter and a control signal called binary_ mode which indicates the operation is in binary mode if it is a "1" (high) and indicates hex mode if it is a "0" (low). These gates effectively cancel the implied "1" in binary notation if the exponents indicate that the number is denormalized number. The output bit 0 of the AND gate 31 and the lesser significant bits of the output bit 0 of the AND gate 31 and the lesser significant bits of the output of the multiplexor 30 form the signal BFRAC (0:59). Bits 1 to 59 are transmitted to special number detector in addition to all the bits being used to form 7 formats of 59 bits. The first format is shift 0, the second is a shift 1 bit right with a fill of the most significant bit with a "0" (low) signal. The fourth format is a shift three bits right and a three bit "0" fill. The fifth format is to shift 1 bit left and fill with "0". The sixth format is to shift 2 bit left and fill with "0". The seventh format is to shift 3 bit left and fill with "0". These seven formats are input to the data ports of the 7 to 1 multiplexor 33.

The exponent least significant bits, bits 13 and 14, indicated the binary alignment within the hexadecimal notation that fraction should use. These two bits are called BEXP (13:14) and are input from the exponent portion of the binary architected to hex internal format convert and are received by the selection shift logic 34. Also the operand format is input to this block from controls. The following is a table of the selection depending on BEXP and the operand format:

| BEXP | | FORMAT | SELECT |
|---|---|---|---|
| 13 | 14 | | |
| 0 | 0 | S, L, XH | shift right by 2 |
| 0 | 1 | S, L, XH | shift right by 1 |
| 1 | 0 | S, L, XH | shift zero |
| 1 | 1 | S, L, XH | shift right by 3 |
| 0 | 0 | XL, XG | shift left by 1 |
| 0 | 1 | XL, XG | shift left by 2 |
| 1 | 0 | XL, XG | shift left by 3 |
| 1 | 1 | XL, XG | shift zero |

Thus, the seven to 1 multiplexor 33 produces the output fraction from having the shift selection outputs 34 and the seven possible shifts.

The special number determination logic receives the inputs BFRAC(1:59) from the fraction portion of this figure and exp_ones and exp_zeros from the exponent portion of this converter, and a binary_mode signal. BFRAC(1:59) is input to a 59 way NOR gate 35 which determines if the fraction is zero, if so then the output is a "1" This output is driven to 2 way AND gates 36 and 37 and 2 way AND gates with this input inverted 37 and 39. Also, input to gates 36 and 37 is exp_zeros, and also input to gates 38 and 39 is exp_ones. The output of gate 36 indicates that the special number zero has been received and the signal out_zero is sent to the special number handling controls 17 in FIG. 1. The output of gate 37 indicates that the special number denormalized has been received and the signal out_denorm is sent to the special number handling controls 17 in FIG. 1. The output of gate 38 indicates that the special number infinity has been received and the signal out_inf is sent to the special number handling controls 17 in FIG. 1. The output of gate 39 indicates that the special number Not-A-Number (NAN) has been detected and a further elaboration of whether it is a quite or signaling NaN is needed. Thus, 3 input AND gate 40 with the input BFRAC(1) inverted, as the true inputs binary_mode and the output of gate 39 is used to determine a signaling NaN which is called out_snan and output to the special number handling controls 17 in FIG. 1. The 3 input AND gate 41 with the inputs BFRAC(1), binary_mode, and the output of gate 39 is used to determine a quiet NaN which is called out_qnan and output to the special number handling controls 17 in FIG. 1.

FIG. 3 shows the hardware employed for the exponent portion of the two binary architected to hex internal converters 15, 16. In the exponent portion, only "I_" bits 1 to 15 are needed. Three formats are created for the three different binary exponent formats: EXP_S, EXP_L, EXP_X; for short, long, and extended operands respectively.

$$EXP\_S=[I\_(1)\|I\_(1)'\|I\_(1)'\|I\_(1)'\|I\_(1)'\|I\_(1)'\|I\_(1)'\|I\_(1)'\|I\_(1)'\|I\_(1)'\|I\_{13}(2:8)]$$

$$EXP\_L=[I\_(1)\|I\_(1)'\|I\_(1)'\|I\_(1)'\|I\_(1)'\|I\_(1)'\|I\_(1)'L\_(2:11)]$$

$$EXP\_X=[I\_(1)\|I\_(1)'\|I\_(2:15)]$$

where I_(1)' indicate the complementation of I_(1).

The 3 input Format Exponent Multiplexer (form Exp Mux) 50 receives these 3 formats as input. The multiplexer 50 also receives the length signal from FPU controls. If short is indicated by the length signal EXP_S is selected, if long then EXP_L is selected, if extended then EXP_X is selected. The output of this multiplexer 50 is represented as FEXP (0:15). The most significant 14 bits, FEXP (0:13) are driven to the adder 53 and the multiplexer 54. The least significant 2 bits of FEXP, bits 14 and 15, are driven to the multiplexer 51 and also a register 58. The output of register 58 is called OLD_EXP(14:15) and is delayed one cycle from the signal FEXP(14:15). The multiplexer 51 is driven by OLD_EXP(14:15) and FEXP(14:15). FPU Controls determines the selection signals for this 2 to 1 multiplexer 51 which is dependent on the format desired. If the format is S, L, or XH, then FEXP(14:15) is selected, and if the format is XL or XG then OLD_EXP(14:15) is selected. The output of this multiplexer 51 is called BEXP(13:14) and it is driven to the control block 52 which determines the selection of variable adder 53 and selection of the 3 input multiplexer 54. This control block also receives an input the signal binary_mode from the FPU controls. If the binary_mode signal is low then the operation is in hex mode and multiplexer 54 chooses the original I_EXP(0:13) as output and the variable adder can add 1 or 2 to the FEXP(0:13) which is a don't care situation. If the binary mode signal is high then the variable adder 53 and multiplexor 54 are set up to produce the following results depending upon the BEXP(13:14):

| BEXP(13:14) | OUT_EXP(0:13) | Variable Add 53 | Mux Select 54 |
|---|---|---|---|
| 00 | FEXP(0:13) + 1 | +1 | Variable Add Out |
| 01 | FEXP(0:13) + 1 | +1 | Variable Add Out |
| 10 | FEXP(0:13) + 1 | +1 | Variable Add Out |
| 11 | FEXP(0:13) + 2 | +2 | Variable Add Out |

The control block 52 select outputs for the variable adder 53 and the multiplexor 54 can be determined from this table for binary mode.

The Variable Adder 53 receives as input FEXP(0:13) from the multiplexor 50. It also receives a select signal from control block 52 which determines whether it should add 1 or 2 to its other input. The output of the adder 53 is driven to multiplexor 54. Multiplexor 54 receives as input the output of the variable adder 53, the input to this overall exponent format converted, I_EXP(0:13) and it receives the output of the multiplexor 50, FEXP(0:13). Other modes of operation, such as handling special numbers can select some of the other combinations not given in the table above which overrides the selection from control block 52. The output of multiplexor 54 is the output exponent, OUT_EXP(0:13).

Also part of the exponent format converter is the detection of special numbers. Special numbers in IEEE 754 standard have all the exponent bits zeros or all ones. To detect this for all three formats which can have 8 exponent bits for short, 11 exponent bits for long, and 15 exponent bits for extended; all three formats are expanded to a 15 bit format. To do this three input formats are created: I_(1:15), any bit of I_(1:11) replicated 4 times and concatenated to I_(1:11), and the third format is any bit of I_(1:8) replicated 7 times and concatenated to I_(1:8). These three formats are input to format multiplexor 55, which chooses the first format if the length signal indicates extended format, the second format for long length, and the third format for short length. The output of the 3 to 1 multiplexor 55 is output to a 15 way NOR gate 56 and a 15 way AND gate 57. The NOR gate 56 determines if all the exponent bits are zero and transmits an active high or 1 signal called exp_zeros if this is the case, else a 0 or low signal is transmitted. The receiver of this signal is the fraction format convert described in FIG. 2. The AND gate 57 determines if all the exponent bits are all ones and transmits the signal exp_ones to the fraction format convert described in FIG. 2.

Rounding and Format Conversion of Hex Internal to Binary Architected

The conversion back to binary from hex is done in the rounder and involves the following formulation:

$$0.hfrac * 16^{(B-8192)} = 1.xxx * 2^{(B''-b'')}$$
Assume: hfrac = .1xxx; b'' = 1023
$$0.1xx * 16^{(B-8192)} = 1.xxx * 2^{(B''-1023)}$$
$$= 1.xxx * 2^{(-1)} * 2^{(4*(B-8192))}$$
$$= 1.xxx * 2^{(4B-32768-1)}$$
$$= 1.xxx * 2^{(4B-32768+1024-2)-1023}$$
$$E'' = 4 * B - 2^{(15)} + 2^{(10)} - 2$$
$$E'' = REVSIGNEXT(4*E) - 2$$

The function REVSIGNEXT can be illustrated by the following table:

| Positional Weight | $2^{15}$ | $2^{14}$ | $2^{13}$ | $2^{12}$ | $2^{11}$ | $2^{10}$ | $2^9$ | $2^8$ | $2^7$ | $2^6$ | $2^5$ | $2^4$ | $2^3$ | $2^2$ | $2^1$ | $2^0$ |
|---|---|---|---|---|---|---|---|---|---|---|---|---|---|---|---|---|
| Bit Position | -2 | -1 | 0 | 1 | 2 | 3 | 4 | 5 | 6 | 7 | 8 | 9 | 10 | 11 | 12 | 13 |
| E = |  |  | x5 | x5' | x5' | x5' | x5' | x5' | x6 | x7 | x8 | x9 | x10 | x11 | x12 | x13 |
| 4E = | x5 | x5' | x5' | x5' | x5' | x5' | x6 | x7 | x8 | x9 | x10 | x11 | x12 | x13 | 0 | 0 |
| $2^{10}-2^{15}$ | 0 | -1 | -1 | -1 | -1 | -1 | 0 | 0 | 0 | 0 | 0 | 0 | 0 | 0 | 0 | 0 |
| $4E - 2^{15} + 2^{10}$ | 0 | 0 | 0 | 0 | 0 | x5 | x6 | x7 | x8 | x9 | x10 | x11 | x12 | x13 | 0 | 0 |

Thus, the following table can be derived:

$$(0.0001\|xxx)*16^{(E-8192)} = 1.xxx*2^{(REVSIGNEXT(4*E)-5-bias)}$$

$$(0.001\|xxx)*16^{(E-8192)} = 1.xxx*2^{(REVSIGNEXT(4*E)-4-bias)}$$

$$(0.01\|xxx)*16^{(E-8192)} = 1.xxx*2^{(REVSIGNEXT(4*E)-3-bias)}$$

$$(0.1\|xxx)*16^{(E-8192)} = 1.xxx*2^{(REVSIGNEXT(4*E)-2-bias)}$$

Figure 4:
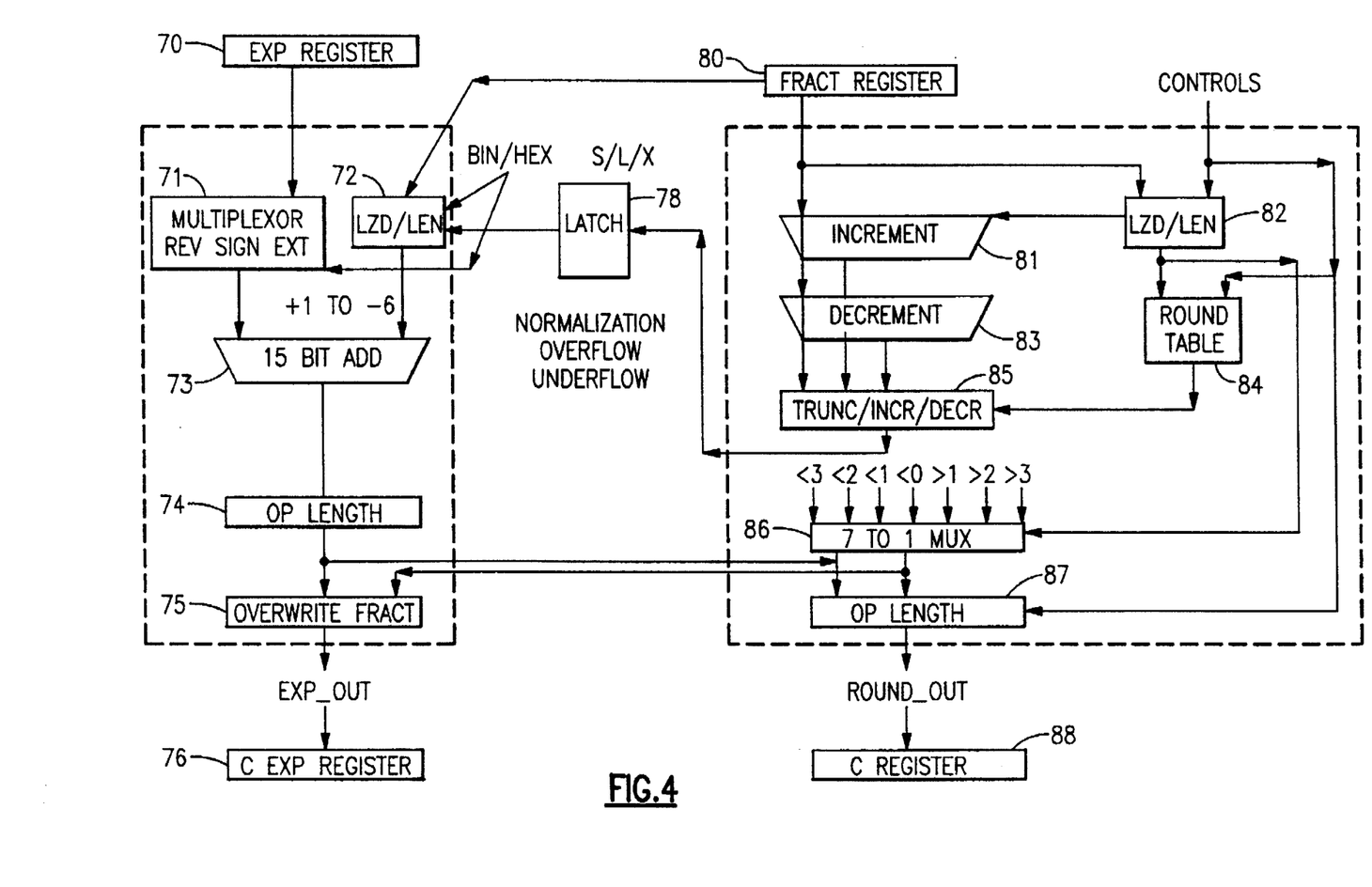
FIG. 4 shows the dataflow of a rounder and the format conversion to binary architected state, in accordance with and embodiment of the present invention.

The dataflow of the rounder 22 of FIG. 1 and the format conversion to binary architected state is shown and described in FIG. 4. The output sign, exponent, faction, guard bit, and sticky bit of the hex internal dataflow 18 are transmitted to the Rounder exponent register 70, fraction register 80 and to controls where they are latched up and in the following cycle drive to other blocks to be described. The exponent is driven to a multiplexor 71 which performs reversing of the sign extension. The output of this multiplexor is called REXP(0:14) and the input can be represented by a generic signal called IN_EXP(0:13). The following table indicates the selection made by the multiplexor block 71:

| binary_mode | length | REXP(0:14) |
|---|---|---|
| 0 | — | [ 0 \|\| IN_EXP(0:13) ] |
| 1 | short | [0(7) \|\| IN_EXP(0) \|\| IN_EXP(9:13) \|\| "00" ] |
| 1 | long | [0(4) \|\| IN_EXP(0) \|\| IN_EXP(6:13) \|\| "00" ] |

-continued

| binary_mode | length | REXP(0:14) |
|---|---|---|
| 1 | extended | [IN_EXP(0) \|\| IN_EXP(2:13) \|\| "00" ] |

The output of the multiplexor 71, REXP(0:14), is driven to the variable adder 73 which also receives a selection of how much to add from control block 72. Control block 72 receives input from a latch indicating to decrement or increment from latch 78 and its outputs are called RDECR_EXP_Q which indicates to decrement, and RINCR_EXP_Q which indicates to increment when active high. Also binary mode and the most significant four bits of the fraction are received by control block 72. This control block determines which bit in the fraction has the most significant one which is guaranteed by the dataflow to be in bit 0, 1, 2, or 3 if the result is non-zero. The following is decisions made by this control block 72 based on these inputs where dash indicates a don't care state:

| RDECR_EXP_Q | RINCR_EXP_Q | BINARY_MODE | LZD | ADD_OUT(0:14) |
|---|---|---|---|---|
| 0 | 0 | 0 | — | REXP + 0 |
| 1 | 0 | 0 | — | REXP − 1 |
| 0 | 1 | 0 | — | REXP + 1 |
| 0 | 0 | 1 | 0 | REXP − 2 |
| 0 | 0 | 1 | 1 | REXP − 3 |
| 0 | 0 | 1 | 2 | REXP − 4 |
| 0 | 0 | 1 | 3 | REXP − 5 |
| 1 | 0 | 1 | 0 | REXP − 3 |
| 1 | 0 | 1 | 1 | REXP − 4 |
| 1 | 0 | 1 | 2 | REXP − 5 |
| 1 | 0 | 1 | 3 | REXP − 6 |
| 0 | 1 | 1 | 0 | REXP − 1 |
| 0 | 1 | 1 | 1 | REXP − 2 |
| 0 | 1 | 1 | 2 | REXP − 3 |
| 0 | 1 | 1 | 3 | REXP − 4 |
| 1 | 1 | x | x | REXP + 0 |

Thus, the selection signals for the 15 bit variable adder 73 are determined by control block 72. The variable adder is capable of adding 1 or 0, or subtracting 1, 2, 3, 4, 5, or 6. The output of the adder is called ADD_OUT(0:14) and it is driven to operand length multiplexer 74. The operand length multiplexer receives control signals to select between several possible formats of ADD_OUT(0:14) or is able to force a constant. The possible constants are dependent on the special number controls and the signal rnd_zero and rnd_inf is used to force a special number in the rounder. The following is a table of the controls:

| BINARY_MODE | RND_ZERO | RND_INF | Length | GEXP(0:14) |
|---|---|---|---|---|
| 0 | 0 | 0 | — | [ADD_OUT(8)' \|\| ADD_OUT(9:14) \|\| 0(8)] |
| 1 | 0 | 0 | short | [ADD_OUT(7:14) \|\| 0(7) ] |
| 1 | 0 | 0 | long | [ADD_OUT(4:14) \|\| 0(4) ] |
| 1 | 0 | 0 | extended | [ADD_OUT(0:14)] |
| — | 1 | 0 | — | "000000000000000" |
| — | 0 | 1 | — | "111111111111111" |
| — | 1 | 1 | — | "000000000000000" |

The most significant 7 bits, GEXP(0:6), is driven to the overwrite fraction multiplexor where a choice is made between GEXP(0:6) and RNDF_OVERWR(1:7) which is signal from the fraction rounder multiplexor 86 which contains fraction bits which may overwrite exponent and sign bit. If the format is extended and it is the second write cycle, the RNDF_OVERWR(1:7) is chosen, else GEXP (0:6) is chosen to drive to C exponent register 76.

The fraction dataflow involves incrementing and decrementing the fraction in parallel with determining the rounding. The fraction is driven from register 80 to an incrementer 81 and a decrementor 83. These are not normal incrementers and decrementers since the dataflow has fight justified the data into the least significant bits of the fraction register but the justification can be off by 0, 1, 2, or 3 depending on the implied binary exponent which is implied within the hex normalization of the number. Thus, a leading zero detect of the most significant bits is used to determine the location of the least significant bit. If the first four bits are "0001" for an extended format the bit to increment and decrement is the least significant on register 80. If the first three bits are "0001" for an extended format the next more significant bit has the weight of the appropriate increment or decrement position. The increment 81 and decrementer 83 are 116 bits and receive the location of the bit to increment from the control block 82. The control block 82 determines the location as follows:

sticky bit calculation to the hex digit boundary but not within the digit which depends on the leading zero detect.

The rounding table 84 is used to determine whether the fraction should have been rounded up, down or truncated. This determines the select signals for the 3 input multiplexor 85. The rounding table follows the conventions dictated by the IEEE 754 standard which determine whether round up, down, or truncate based on the rounding mode and the least significant bit (LSB), the guard bit (B), and the sticky bits (S). For instance if the rounding mode is round to nearest and the following is the rounding dictated:

| LSB | G | S | Choose: |
|---|---|---|---|
| x | 0 | x | truncate |
| x | 1 | 1 | increment |
| 0 | 1 | 0 | truncate |
| 1 | 1 | 0 | increment |

This is a standard implementation of an IEEE 754 rounding table. The output signals of the rounding table 84 drive the 3 to 1 multiplexor 85 which receives outputs from the fraction register 80 if truncate is selected, the incrementer 81 if increment is selected, and the decrementer 83 if decrement is selected. Additionally, the carry out and selection are used to determine if the exponent needs to be incremented or decremented in addition to any other type of correction. If

| BINARY_MODE | Length | LZD | Location | LSB | Guard Bit | Sticky Bits |
|---|---|---|---|---|---|---|
| Hex | Short | x | 112 | 112 | 113 | x |
| Binary | Short | 3 | 115 | 115 | 116 | sticky |
| Binary | Short | 2 | 114 | 114 | 115 | sticky or 116 |
| Binary | Short | 1 | 113 | 113 | 114 | sticky or (116 to 115) |
| Binary | Short | 0 | 112 | 112 | 113 | sticky or (116 to 114) |
| Hex | Long | x | 112 | 112 | 113 | x |
| Binary | Long | 3 | 115 | 115 | 116 | sticky or (117 to 119) |
| Binary | Long | 2 | 114 | 114 | 115 | sticky or (116 to 119) |
| Binary | Long | 1 | 113 | 113 | 114 | sticky or (115 to 119) |
| Binary | Long | 0 | 112 | 112 | 113 | sticky or (114 to 119) |
| Hex | Extended | x | 112 | 112 | 113 | x |
| Binary | Extended | 3 | 115 | 115 | 116 | sticky |
| Binary | Extended | 2 | 114 | 114 | 115 | sticky or (116) |
| Binary | Extended | 1 | 113 | 113 | 114 | sticky or (115 to 116) |
| Binary | Extended | 0 | 112 | 112 | 113 | sticky or (114 to 116) |

Also, shown in this table is the determination of which bit is the least significant, which bit is the guard bit, and which bits to or together in addition to the bits which were ORed together in the hex dataflow which is represented by the signal, sticky.

These signals are transmitted on to the rounding Table 84 and are not necessary to determine in control block 82 if they were determined completely in the hex internal dataflow. In the example implementation, only partial sticky information is provided by the hex internal dataflow which includes there is a carry out of the incrementer 81 and increment is selected then a signal is driven to latch 78 indicating that an additional increment of the exponent is needed. If there is no carry out of decrementer and decrement is selected then an additional decrement of the exponent is needed and this indication is driven to latch 78. Control logic will take over in these rare cases to force the proper result using this dataflow. The normally chosen path is that neither of these cases are indicated to latch 78 and the data output of multiplexor 85 is driven to the 7 to 1 multiplexor 86 which can shift up to 3 bits to the right or 3 bits to the left. The selection of how many bits to shift is determined by control block 82. There are multiple modes that control block 82 can base its selection on such as binary align the data in the case of a divide operation or the case that concerns this invention the transforming of hex internal data to binary architected. In this case the data is shifted based on the examination of the most significant digit of the fraction. If the first bit of this most significant digit is a one, a shift of zero is indicated; if the most significant two bits of this digit are "01" then a shift of 1 bit to the left is indicated, if the most significant three bits of this digit are "001" then a shift of 2 bits to the left is indicated, and neither of these cases are indicated then a shift of 3 bits to the left is indicated.

The output of this multiplexor 86 is driven to the fraction operand length multiplexor 87 along with the output of the exponent rounder GEXP(7:14). The following are selections of this multiplexor 87 which are determined by the operand length and mode from controls:

| Binary Mode | Length | ROUND_OUT(0:55) |
|---|---|---|
| Hex | Short | FRACT(89:112) \|\| 0(32) |
| Hex | Long | FRACT(57:112) |
| Hex | Extended cycle 1 | FRACT(0:55) |
| Hex | Extended cycle 2 | FRACT(56:111) |
| Binary | Short | GEXP(7) \|\| FRACT(90:112) \|\| 0(32) |
| Binary | Long | GEXP(7:10) \|\| FRACT(61:112) |
| Binary | Extended cycle 1 | GEXP(7:14) \|\| FRACT(1:48) |
| Binary | Extended cycle 2 | FRACT(57:112) |

Thus, ROUND_OUT is determined which drives the fraction C register 88. Also, output from multiplexer 86 is the most significant 8 bits to potentially overwrite the sign and exponent for the first cycle of an extended binary operand, this signal is referred to as RNDF_OVERWR (0:7).

Miscellaneous Hardware

As described above, sticky bit calculation is also a part of the overall scheme for executing binary floating point format on a hexadecimal dataflow. Commonly assigned U.S. patent application Ser. No. 08/414,072, filed Mar. 31, 1995, and entitled "Parallel Calculation of Exponent and Sticky Bit During Normalization" describes an embodiment of sticky bit hardware that may be employed in the present invention.

Special Number Handling controls, as described hereinabove, are also included as part of a preferred embodiment of the present invention. They are tables that determine either the result given that one or both of the input operands is a special number, or they determine an execution routine. The first mechanism is simply a look-up table which contains the result based on the type of number for each input operand and the type of instruction being executed. An example of this mechanism is that given an input operand is a NaN (Not-A-Number) the result is equal to a NaN. The second mechanism is similar to a micro routine. It determines the control signals for the multiple cycles of execution of the operation. an example of this mechanism is a routine to calculate an binary add of denormalized numbers. The dataflow is put in a non-pipelined mode state and then the operands are prenormalized prior to adding them. An ordinary hexadecimal dataflow would calculate a wrong result if prenormalization was not performed. This second mechanism determines the control signals for each cycle of execution until the result is written to the FPRs.

EXAMPLES

Figure 5:
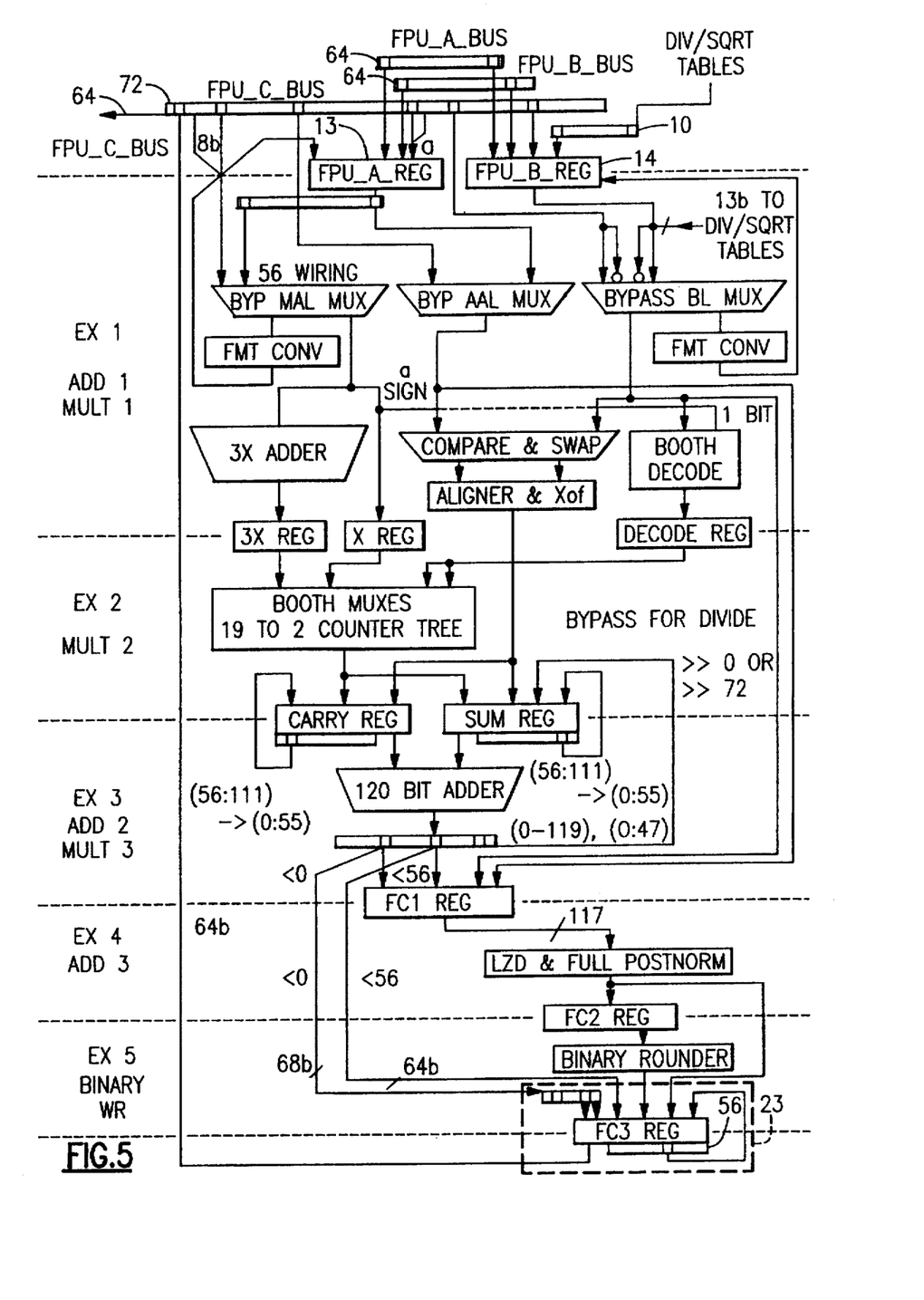
FIG. 5 further illustrates a dataflow in accordance with the present invention.

The following instructions, including Add Long and Multiply Long, are provided as examples to illustrate operation of the dataflow according to the present invention which is not limited thereto. In connection with the description of these instructions, FIG. 5 provides further illustration of functional elements included in the dataflow according to an embodiment of the present invention.

Add Long (not special)

Each cycle of the add long is described and an example is used for clarity of exposition. For an example assume:

$$A = +1.0$$
$$= (-1)^0 * (1).0000 * 2^{1023-1023}$$
$$A\_SIGN = 0$$
$$A\_EXP = 011,1111,1111_2 = 3FF_{16}$$
$$A\_FRACT = 0$$
$$A\_INPUT = 3FF0000000000000_{16}$$
$$B = -0.FFFFFFFFFFFFFFF8_{16}$$
$$= (-1)^1 * (1).FFFFFFFFFFFFFFF_{16} * 2^{1022-1023}$$
$$B\_SIGN = 1$$
$$B\_EXP = 011,1111,1110_2 = 3FE_{16}$$
$$B\_FRACT = FFFFFFFFFFFFFF_{16}$$
$$B\_INPUT = BFEFFFFFFFFFFFFF_{16}$$

1. The dataflow for a binary add long involves format conversion, using the normal add dataflow, and then rounding. First the operands are latched into A and B registers 13 and 14, respectively, assuming that they are hex operands. The only problem with this is that there are some exponent bits in the most significant bits of fraction. Thus, the original 64 bit input is recreated from examining the sign, exponent, and fraction registers.

$$A(0:63) = A\_SIGN\_REG\_Q || A\_EXPREG\_Q(0,8:13) || A\_REG\_Q(0:55)$$

The binary fraction is formed by taking ("1")||A(12:63) ||0(7)) where "1" denotes a binary one and 0(n) denotes n concatenated binary zeros. This is transformed into a hex fraction by binary aligning it using bits A(10:11) to determine the alignment. The resulting hex fraction is 56 bits since at most 3 zeros need to appended to the most significant bits. The hex exponent is also calculated by the format converter 11. A(1:11) is SIGNEXT to 14 bits after the least significant two bits are truncated. Then one is added to resulting exponent and additional one is added using the carry in to the adder 53 if A(10:11)=3(BEXP 13:14; which corresponds to adding 2). Thus, the new exponent is easy to form. The format converters also check the input operands to see if they are special numbers. If not, the following is the add procedure.

Using the same example data, format conversion is performed:

$$A\_SIGN\_REG\_Q = 0$$
$$EXP \bmod 4 = 3$$
$$A\_EXPREG\_Q(0:13) = SIGNEXT(3FF_{16} >> 2) + 2$$
$$= 01,1111,1111,1111_2 + 2$$
$$= 10,0000,0000,0001_2 = 2001_{16}$$
$$A\_REG\_Q(0:55) = (0.0001 || f)$$
$$= 10000000000000_{16}$$
$$B\_SIGN\_REG\_Q = 1$$
$$EXP \bmod 4 = 2$$
$$B\_EXPREG\_Q(0:13) = SIGNEXT(3FE_{16} >> 2) + 1$$
$$= 01,1111,1111,1111_2 + 1$$
$$= 10,0000,0000,0000_2 = 2000_{16}$$
$$B\_REG\_Q(0:55) = (0.1 || f || 000)$$
$$= FFFFFFFFFFFFFF8_{16}$$

2. The 56 bit fractions and 14 bit exponents are sent to the first cycle of a three cycle pipeline for add which involves aligning the fractions. The exponents are compared and the operand with the smaller exponent is shifted to the alignment of the larger exponent. The smaller operand is also complemented if the operation is an effective subtraction. The alignment results in a 60 bit fraction for the small operand which maintains an addition hex digit of guard bits. The aligner is paired with a hardware unit located in sticky bit block 19 which determines if the alignment caused any shifting out of the 60 bits which are equal to one. This is needed later for the rounding circuit. Note that shifting out ones for an add will result in the calculated value being less than the actual, but for an effective subtract the calculated value will be more than the actual. At the end of the A1 cycle the 60 bit small operand and 56 bit big operand are latched in low order bits of a SUM and a CARRY register starting at bit 56. Note that if a zero operand is detected, the alignment can be overridden. The exponent of the big operand is latched into the SC_EXPREG.

For the example:

SC_EXPREG_Q(0:13)=10,0000,0000,0001$_2$=2001$_{16}$

SUM_REG_Q(0:119) = (00000000000000||10000000000000||00)$_{16}$

SUM_REG_Q(0:119) = (000000000000001000000000000000)$_{16}$

CARRY_REG_Q(0:119)=(FFFFFFFFFFFFF|| 0FFFFFFFFFFFFF8||F)$_{16}$

CARRY_REG_Q(0:119) = (FFFFFFFFFFFFFF|F00000000000007||F)$_{16}$

CARRY_REG_Q(0:119) = (FFFFFFFFFFFFFFF00000000000007F)$_{16}$

CARRY_IN_REG=1

STICKY_BIT=0

3. The next cycle involves performing the carry propagate add (2 to 1 add). The result of the add is 60 bits with potentially a carry. The result is shifted 56 bits to line up with bit 0 of FC1 register and the carry (add out bit 55) is latched into FC1 Carry register. The exponent is moved from the SC_EXPREG to the FC1_EXPREG in this cycle. No bits of significance are lost during this add so no further sticky bit calculation is needed in this cycle.

For the example:

SUM_REG_Q(0:119) = (000000000000001000000000000000)$_{16}$

CARRY_REG_Q(0:119) = (FFFFFFFFFFFFFFF00000000000007F)$_{16}$

ADD_OUT(0:119) = (000000000000000000000000000080)$_{16}$ output is shifted 56b

FC1_REG_Q(0:119) = 000000000000008000000000000000)$_{16}$

FC1_EXPREG_Q(0:13)=10,0000,0000,0001$_2$=2001$_{16}$

STICKY BIT=0

4. The fourth cycle of execution involves normalizing the resulting data. A Leading Zero Detect (LZD) of the fraction is performed to determine the number of hex digits to shift left. The fraction that is shifted consists of a carry digit (3 zeros and the carry register) and the fraction digits. The exponent in FC1 corresponds to a radix point between the carry and fraction digits. The exponent during normalization is first incremented by 1 to correspond to a radix point to the left of the carry digit and then the shift amount is subtracted from the exponent. The resulting fraction is latched into FC2 register and exponent in FC2_EXPREG. A sticky bit calculation needs to be performed in this cycle to determine if there is no shift and then see if the last hex digit of significance contains any ones.

For example:

FC1_REG_Q(0:119) = (00000000000008000000000000000)$_{16}$

FC_1EXPREG_Q(0:13)=10,0000,0000,0001$_2$=2001$_{16}$

FC2_REG_Q(0:115) = (8000000000000000000000000000)$_{16}$

FC2_EXPREG_Q(0:13)=01,1111,1111,0011$_2$=1FF3$_{16}$

STICKY_BIT=0

5. The fifth cycle of execution performs rounding and format conversion. The last bits of the least significant hex digit are examined for ones depending on in which location in the most significant hex digit there is a one. The fraction minus these last bits is aligned and then sent to a decrementer 83 and rounder 20. The sticky information and rounding mode is used to access a look-up table which determines whether the result should be truncated, incremented, or decremented. And a 3 to 1 multiplexor is used to choose the appropriate result. Additionally, a format conversion 21 is performed which deletes the most significant one and updates the exponent with the binary normalization information. The format conversion merges the sign, exponent, and fraction and stores them into FC3 sign, exponent, and fraction (i.e., C register 23) registers as though the data were hex. This implies that only 7 of the exponent bits are stored in the exponent register and the rest are merged with the faction and stored in FC3 register. Thus, rounding and format conversion are performed in this fifth cycle of execution.

For the example:

FC2_REG_Q(0:115) = (8000000000000000000000000000)$_{16}$

FC2_EXPREG_Q(0:13)=01,1111,1111,0011$_2$=1FF3$_{16}$

STICKY BIT=0

BFRAC=$(-1)^0 * 0.10000_2 * 16^{1FF3_{16} - 2000_{16}}$

SIGN=0

FRAC=(1).000000$_2$ one is implied

EXP(0:10)=REVSIGNEXT(4*01,1111,1111,0011$_2$)−2

EXP(0:10)=REVSIGNEXT(0111,1111,1100,1100$_2$)−2

EXP(0:10)=011,1100,1100$_2$−2

EXP(0:10)=011,1100,1010$_2$)=970$_{10}$ result=+1.0*$2^{970-1023}$=$2^{-53}$

Multiply Long (not special)

To illustrate the steps of the multiply long the same data from add long is used.

```
A = +1.0
  = (-1)^0*(1).0000*2^{1023-1023}
A_SIGN = 0
A-EXP = 011,1111,1111_2 = 3FF_{16}
A_FRACT = 0
A_INPUT = 3FF0000000000000_{16}
B = -31 0.FFFFFFFFFFFFFF8_{16}
  = (-1)^1*(1)FFFFFFFFFFFFFF_{16}*2^{1022-1023}
B_SIGN = 1
B_EXP = 011,1111,1110_2 = 3FE_{16}
B_FRACT = FFFFFFFFFFFFFF_{16}
B_INPUT = BFEFFFFFFFFFFFFF_{16}
```

1. Whether the operation be multiply or add, the binary data must be converted into hex data. Thus, the first cycle of execution involves format conversion. This is the same as for add and is not pipelineable, but both operands are converted in parallel and stored back into A and B registers.

Using the same example data, format conversion is performed:

```
A_SIGN_REG_Q = 0
       EXP mod 4 = 3
A_EXPREG_Q(0:13) = SIGNEXT(3FF₁₆ >>2) + 2
                 = 01,1111,1111,1111₂ +2
                 = 10,0000,0000,0001₂ = 2001₁₆
   A_REG_1(0:55) = (0.0001 ||f)
                 = 10000000000000₁₆
B_SIGN_REG_Q = 1
       EXP mod 4 = 2
B_EXPREG_Q(0:13) = SIGNEXT(3fe₁₆ >>2) + 1
                 = 01,1111,1111,1111₂ +1
                 = 10,0000,0000,0001₂ = 2000₁₆
   B_REG_Q(0:55) = (0.1 ||f||000)
                 = FFFFFFFFFFFFF8₁₆
```

2. The hex internal dataflow has a three cycle pipeline multiplication. The second cycle of executing the multiplication involves executing the first cycle of the hex dataflow pipeline which involves a 3× calculation of operand A and 4 bit overlap Booth decoding operand B. All fraction bits participate and none are shifted out. The A operand 3× calculation and staging is latched in 3× and X registers which have two copies each called A copy and B copy. The Booth decode logic is latched in the Booth Decode registers. The exponent calculation consists of adding the two exponents and subtracting the bias, 8192, and the result is latched in the M1 EXPREG.

For the example:

```
M1_EXPREG = 2001₁₆ + 2000₁₆ − 2000₁₆(bias)
          = 2001₁₆
X_REG_1(0:63) = 1000000000000000₁₆
3X_REG_Q(0:65) = 03000000000000000₁₆
```

3. The second cycle of execution in the hex internal pipeline involves completing the summing of partial products using a counter tree. The result is two terms called the carry and sum which are latched in the CARRY and SUM register. The exponent is M1 EXPREG is moved to SC EXPREG in this cycle.

For the example:
SC_EXPREG=2001₁₆
The result is two terms called carry and sum.

4. The fourth cycle involves a carry propagate add of the CARRY and SUM register and the resulting fraction is latched in FC1 register. The fraction can be hex unnormalized by at most one hex digit ff the input data was not zero or a denormalized number. The exponent is driven from SC EXPREG to FC1 EXPREG in this cycle.

For the example:
FC1_EXPREG=2001₁₆
ADD_OUT(0:119) = 0FFFFFFFFFFFFFF8000000000000000₁₆
FC1_REG_₃1(0:119) = 0FFFFFFFFFFFFFF8000000000000000₁₆

5. The fifth cycle is not really necessary but it eases the control design of the dataflow. This cycle normalizes the data using a full post normalizer. The resulting fraction is latched into FC2 register (i.e., registers to 180). In this cycle, the sticky bit is calculated based on any hex digits which extend beyond the length of the format (short=7 hex digits, long=14 hex digits). The exponent is updated with the shift amount which could at most be one hex digit shift left. The resulting exponent is stored into FC2 EXPREG.

For the example:
FC2_EXPREG=2000₁₆
FC2_REG_Q(0:115) = FFFFFFFFFFFFFF8000000000000000₁₆

6. The final cycle involves rounding 20 and format conversion 21. The sticky bit and rounding mode are used to determine whether to increment or truncate the 53 bit product after binary alignment. The corresponding exponent is also updated. The final 53 bits of fraction and 8 bits of exponent along with the sign bit are converted into a hex format which is ready to be written in architectural format.

For the example:
FC2_EXPREG=2000₁₆
FC2_REG_Q(0:115) = FFFFFFFFFFFFFF8000000000000000₁₆
$BFRAC=(-1)^1*0.FFFFFFFFFFFFF8_{16}*16^{2000}_{16}^{-2000}_{16}$
SIGN=1
$(0.1||xxx)*16^{E-8192}=1.xxx*2^{REVSIGNEXT(4*E)-2-bias}$
EXP=REVSIGNEXT(4*10,0000,0000,0000₂)−2
EXP=REVSIGNEXT(1000,0000,0000,0000₂)−2
EXP=100,0000,0000₂−2
EXP=011,1111,1110₂=3FE₁₆=1022₁₀
$result=(-1)^1*(1).FFFFFFFFFFFFF_{16}*2^{1022-1023}$
$result=(-1)^1*(1).FFFFFFFFFFFFFF_{16}*2^{-1}$
result=−0.FFFFFFFFFFFFF8₁₆

FC3 register is assumed to be in hex format and it is converted into architectural format (conversion only involves wiring concatenation) and is driven onto the FPU C bus (i.e., result bus). This bus drives the register files FPRs 10.

It may be appreciated, therefore, that the proposed invention provides a means for executing floating point operations in either of two architected floating point data types, and particularly, either S/390 hexadecimal format or IEEE 754 binary format. The present invention provides a floating point unit having very high performance on hex operations and provides compatibility of binary operations, without significant loss of performance for these binary operations.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope and without diminishing its attendant advantages. It is therefore intended that the present invention is not limited to the disclosed embodiments but should be defined in accordance with the claims which follow.

What is claimed is:

1. A computer system supporting a plurality of floating point architectures, each flowing point architecture having at least one format, said system comprising:

a floating point unit having an internal dataflow according to an internal floating point format having a number of exponent bits which is the minimum number required to support each of said plurality of floating point architectures, said floating point unit performing floating point operations in said internal floating point format; and conversion means for converting between each one of said plurality of floating point architectures and said internal floating point format such that an operand of any one of said plurality of floating point architectures input to said floating point unit is converted into said internal floating point format for operation by said floating point unit, and the result of the operation is converted into any one of said plurality of floating point architectures.

2. The computer system according to claim 1, wherein said plurality of floating point architectures includes a hexadecimal floating point architecture and IEEE 754 binary floating point architecture.

3. The computer system according to claim 2, wherein said floating point unit includes:

means for determining a sticky bit;

means for rounding a binary floating point number according to IEEE 754 rounding modes; and means for special number handling.

4. The computer system according to claim 2, wherein said hexadecimal floating point architecture is IBM S/390 hexadecimal architecture.

5. The computer system according to claim 4, wherein said internal floating point format is a hexadecimal format that has a fourteen bit exponent biased by 8192, a sign bit, and a 56 bit fraction.

6. The computer system according to claim 1, wherein said plurality of floating point architectures includes a binary architected format and an hexadecimal architected format, and said internal format is a hexadecimal internal format.

7. The computer system according to claim 6, wherein said hexadecimal architected format and said hexadecimal internal format each have a common predetermined bias type, said predetermined bias type being either an even bias or an odd bias.

8. The computer system according to claim 7, wherein said predetermined bias type is even, and said hexadecimal internal format has a nonzero positive integer number (N+1) of exponent bits and a bias equal to $2^N$.

9. The computer system according to claim 1, wherein said plurality of floating point architectures includes a binary architected format and an hexadecimal architected format, and said internal format is a hexadecimal internal format, and wherein said conversion means includes:

a first converter that converts said hexadecimal architected format to said hexadecimal internal format;

a second converter that converts said binary architected format to said hexadecimal internal format;

a third converter that converts said hexadecimal internal format into said binary architected format; and a fourth converter that converts said hexadecimal internal format into said hexadecimal architected format.

10. The computer system according to claim 1, wherein said plurality of floating point architectures includes a binary architected format and an hexadecimal architected format, and said internal format is a hexadecimal internal format, and wherein said conversion means includes:

a first converter that applies a transformation to convert said hexadecimal architected format to said hexadecimal internal format, and applies said transformation to binary architected format data to provide transformed binary architected format data;

a second converter that converts said transformed binary architected format data to said hexadecimal internal format;

a third converter that converts said hexadecimal internal format into said transformed binary architected format data; and a fourth converter that applies a second tranformation that converts said hexadecimal internal format into said hexadecimal architected format, and applies said second transformation to said transformed binary architected format data to provide said binary architected format data.

11. In a computer system, a floating point unit that supports a first floating point architecture and a second floating point architecture, said first and second floating point architectures each having at least one format, said system comprising:

a floating point unit having an internal dataflow with an internal floating point format which supports both said first floating point architecture and said second floating point architecture, and that performs floating point operations on data formatted in said internal floating point format;

a first converter that applies a transformation to convert an operand of said first floating point architecture type to said internal floating point format, and applies said transformation to an operand of said second floating point architecture type to provide transformed second floating point architecture type data;

a second converter that converts said transformed second floating point architecture type data to said internal floating point format;

a third converter that converts data of said internal floating point format into data of said transformed second floating point architecture type; and a fourth converter that applies a second tranformation that converts data of said internal floating point format into data of said first floating point architecture, and applies said second transformation to data of said transformed second floating point architecture type to provide data of said second floating point architecture type.

12. The computer system according to claim 11, wherein an operand of said first floating point architecture type is directly converted into said internal floating point format by said first converter for operation by said floating point unit, and wherein an operand of said second floating point architecture type is converted into said internal floating point format by said first converter and said second converter operating in series.

13. The computer system according to claim 11, wherein data in said internal floating point format is directly converted into data of said first floating point architecture by said fourth converter, and wherein data in said internal floating point format is converted into data of said second floating point architecture type by said third converter and said fourth converter operating in series.

14. The computer system according to claim 11, wherein said internal floating point format has a minimum nonzero positive number of exponent bits, N, to support both first and second floating point architectures.

15. The computer system according to claim 11, wherein said first and second floating point architectures have different bias types, the bias types being either of even type or odd type, said internal format having a bias type that matches said first floating point architecture.

16. The computer system according to claim 15, wherein said internal floating point format has a minimum nonzero positive number of exponent bits, N, to support both first and second floating point architectures, and wherein said internal floating point has an even bias of $2^{(N-1)}$.

17. The computer system according to claim 11, wherein said internal format has the same base and bias type as one of said first and second floating point architectures, the same bias type being either even or odd.

* * * * *